Oct. 27, 1936.  E. A. SPERRY, JR  2,058,642
SELF SYNCHRONOUS TRANSMISSION SYSTEM CONTROLLED SERVOMOTOR
Filed April 13, 1935
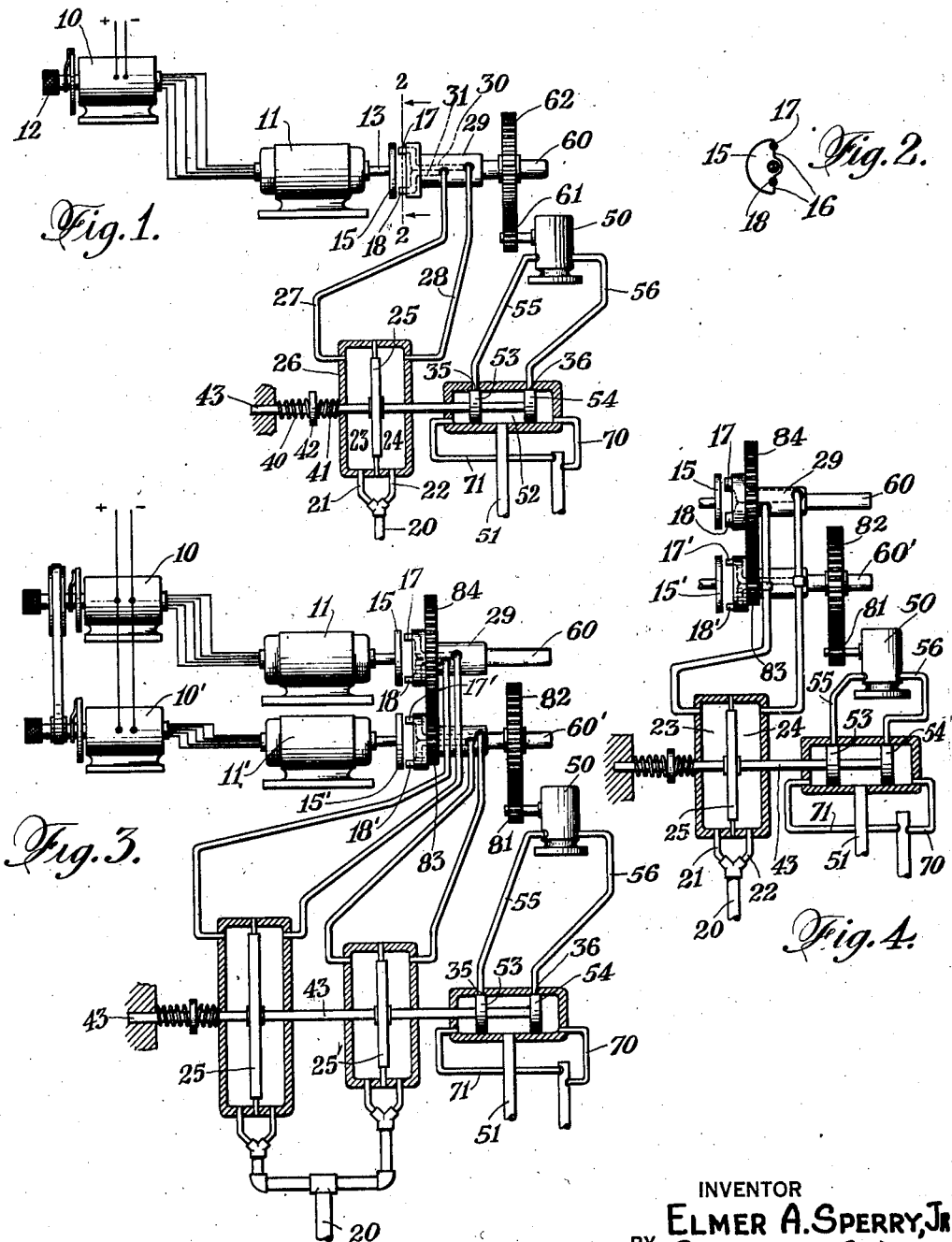
INVENTOR
ELMER A. SPERRY, JR
BY
ATTORNEY Patented Oct. 27, 1936

2,058,642

UNITED STATES PATENT OFFICE 2,058,642

SELF-SYNCHRONOUS TRANSMISSION-SYSTEM-CONTROLLED SERVOMOTOR

Elmer A. Sperry, Jr., Brooklyn, N. Y., assignor to Sperry Products, Inc., Brooklyn, N. Y., a corporation of New York Application April 13, 1935, Serial No. 16,152

4 Claims. (Cl. 121—41)

This invention relates to servo-motor systems designed particularly for use in connection with A. C. self-synchronous transmission systems. Such systems are well known in the art and one of these that may be mentioned is the selsyn transmission system which consists in a pair of similar selsyn devices, one a transmitter and the other a receiver. The receiver, however, is incapable of performing work which requires a substantial torque on its operating shaft so that the receiver in such a system has heretofore been employed mainly for operating indicators and similar devices which place very little torque upon the receiver shaft. It is the principal function of my invention to provide in combination with such a system, that is, with an A. C. self-synchronous transmission system, a servo-motor system controlled by said transmission system and which is capable of producing any amount of torque with minimum reaction back on the transmission system.

Further objects and advantages of this invention will become apparent in the following detailed description thereof.

In the accompanying drawing,

Fig. 1 is an assembly view largely diagrammatic illustrating one form of my invention.

Fig. 2 is a view taken on the line 2—2 of Fig. 1.

Fig. 3 is a view similar to Fig. 1 illustrating a modified form of my invention.

Fig. 4 is a view similar to Fig. 1 illustrating still another modification of my invention.

Referring first to Fig. 1, I have indicated diagrammatically an A. C. self-synchronous transmission system, which in this case comprises two selsyn motors 10 and 11, one of said motors 10 being utilized as a transmitter operated by handle 12 and the other of said motors acting as a receiver, and the armature shaft 13 of said receiver being in synchronism with the armature shaft of motor 10 which is rotated by handle 12. The construction of said motors is well known, since the selsyn motors are standard commercial products, and therefore need not be further described here. Suffice it to say that the torque upon the armature shaft 13 is very slight and therefore there has heretofore been placed upon such shaft only such light weight members as dials or pointers for indicating position.

In order that the receiver 11 may be instrumental in controlling the application of a large amount of torque, I cause said receiver to control a fluid pressure servo-motor as follows: Upon the shaft 13 I mount a semi-circular shutter 15 whose straight edge 16 normally cooperates with two jets 17 and 18 which are in line with said edge 16, thus forming a valve mechanism, so that fluid under pressure issuing from said nozzles 17 and 18 will issue to the same extent and therefore the reaction pressures on said nozzles will be equal. Fluid under pressure is normally supplied to said nozzles from any suitable source of supply by way of tube 20 which divides into two paths 21 and 22 entering two chambers 23 and 24 on opposite sides of a diaphragm 25 within a casing 26 and issuing from said chambers by way of passages 27 and 28 extending into a block 29 and thus by way of suitable grooves 30 and 31 to the respective nozzles 17 and 18. The diaphragm 25 is normally maintained centralized by means of springs 40 and 41 acting upon a flange 42 fixed to the stem 43 connected to the diaphragm.

If, now, the transmitter 10 is actuated by operation of handle 12, the receiver 11 will respond and the shaft 13 will be correspondingly rotated to set itself in a position synchronous with the shaft of motor 10. Such movement, however, carries shutter 15 away from its normal position and causes it to uncover one of said nozzles 17, 18 and cover the other of said nozzles. This sets up differential reaction pressures on said nozzles 17 and 18 which differential reaction pressures act upon the diaphragm 25 to cause said diaphragm to be moved to the right or left (in Fig. 1) and said movement of the diaphragm is caused to control the application of a torque-applying means.

One such torque applying means is disclosed in Fig. 1 and may take the form of an oil motor 50 which may be of the mesh gear type, not shown, oil normally being supplied under pressure from a suitable source to an oil line 51 into a valve chamber 52. The passage of the oil from valve chamber 52 to the oil motor is normally prevented when the diaphragm 25 is in its centralized position by reason of piston members 53 and 54 closing the valves 35, 36 leading to oil lines 55 and 56 extending into opposite sides of the oil motor. When, however, the diaphragm 25 is actuated in one direction or the other, pistons 53 and 54 mounted on the stem 43 which also carries said diaphragm, will be moved to the right or to the left to connect line 55 or line 56 with the oil line 51 and thus feed oil under pressure into the oil motor to drive the same in one direction or the other depending upon whether the oil is being supplied by pipe 55 or pipe 56. The return of the fluid is through the other of said lines and return pipes 70, 71. The oil motor thus operated will apply torque to a power-driven shaft 60 by any suitable means such as gearing 61, 62 between the oil motor and said shaft. Said power-driven shaft carries the nozzles 17 and 18 so that there is a follow-up, that is to say, shaft 60 will rotate until nozzles 17 and 18 are again lined up with the edge 16 of shutter 15 and thus the movement of the shaft 60 will cease because diaphragm 25 will then return to its original position and thus actuate pistons 53 and 54 to cut off the supply of oil under pressure to the oil motor.

From the above description it will be seen that I have provided a combination as follows: (1) an A. C. self-synchronous transmission system, the transmitter of which is not capable of producing any appreciable torque; (2) a valve mechanism controlled by said transmission system, said valve mechanism comprising the jets 17 and 18; (3) a relay system comprising the diaphragm 25 controlled by said valves 17 and 18 and pistons 53 and 54 carried by the diaphragm; (4) valves 35 and 36 controlled by said pistons 53 and 54; and (5) servo-motor 50.

In Fig. 3 I have shown a modification of my invention whereby I am enabled to secure very accurate operation of a driven member in accordance with the movements of the transmitter. The transmission system in this case comprises a coarse transmitter 10 and a fine transmitter 10′, the fine transmitter being geared to rotate through several revolutions for every revolution of the coarse transmitter. A pair of receivers 11 and 11′ are provided which are driven from said coarse and fine transmitters and therefore reproduce the coarse and fine movements of the transmitter shafts. Said receivers control valve mechanisms, said mechanisms comprising shutters 15 and 15′ and sets of nozzles 17, 18 and 17′, 18′ as in the Fig. 1 form and each of said sets of nozzles controls a diaphragm 25, 25′, said diaphragms being both mounted on the same shaft. Because of its larger area the diaphragm 25 will normally overpower the diaphragm 25′. The oil motor is geared to the power-driven shafts through suitable gearing 81, 82, 83, 84. The gears 82 and 83 are on the shaft 60′ which carries the jets 17′, 18′ while the shaft 60 carries the jets 17, 18. The shaft 60′ moves through the same number of revolutions as the shafts of the fine transmitter and receiver, while the shaft 60 moves through the same number of revolutions as the shafts of the coarse transmitter and receiver.

The operation of the Fig. 3 form of the invention is as follows: Assume that the circuit is broken between transmitters 10, 10′ and receivers 11, 11′ and that half-disks 15, 15′ are standing in any position and that nozzles 17, 18 and 17′, 18′ are in any desired position. As soon as the circuit is established between transmitters 10, 10′ and receivers 11, 11′, disks 15, 15′ will snap into position in synchronism with the transmitting elements 10, 10′. It may happen at this point, however, that in the position occupied by disk 15, nozzle 17 is uncovered and nozzle 18 covered, while in the position occupied by disk 15′, nozzle 17′ is covered and nozzle 18′ is uncovered. This means that diaphragm 25 will tend to force shaft 43 in one direction while diaphragm 25′ will tend to force said shaft in the opposite direction; but because diaphragm 25 is so much larger, the total pressure thereon is so much greater than the opposite pressure on diaphragm 25′ that diaphragm 25 will overpower diaphragm 25′ and force shaft 43 in a given direction, irrespective of the opposite effect of diaphragm 25′. This is necessary because the nozzles 17, 18 are in one-to-one relation to the movements of the coarse transmitter 10 and must at all times control. It is for this reason that the two diaphragms 25 and 25′ of different sizes are provided. The movement of shaft 43 in a direction dictated by diaphragm 25 will cause the motor 50 to drive shafts 60′ and 60 in a direction such that the nozzles 17 and 18 tend to line up with the edge of disk 15. As this line-up is approached, the nozzles 17′, 18′ will also approach coincidence with the edge of disk 15′ and as the position transmitted by transmitters 10 and 10′ is approached by nozzles 17, 18 and nozzles 17′, 18′, the two sets of nozzles will reach coincidence and the two diaphragms 25 and 25′ will both be pushing shaft 43 in the same direction. Because of the larger angular movement of nozzles 17′, 18′, the latter nozzles will control the final settling to a much finer point than would otherwise be obtained.

In the Fig. 4 form of my invention I obtain the same result as in the Fig. 3 form but without the use of a pair of diaphragms. In Fig. 3, the air issues from the nozzles 17, 18, and 17′, 18′ with equal force, and the unequal strengths of the diaphragms 25 and 25′ are relied upon to give the coarse and fine response. In the Fig. 4 form of the invention, I employ but a single diaphragm 25 and supply air to nozzles 17 and 17′ from one side 23 of the diaphragm chamber and supply air to nozzles 18 and 18′ from the other chamber 23 of the diaphragm casing. In order to obtain the coarse and fine response, however, I form nozzles 17 and 18 with much larger outlets than nozzles 17′ and 18′ so that considerably more air issues from 17 and 18 than from 17′ and 18′. In this way, the set of nozzles 17′, 18′ is rendered more sensitive than nozzles 17, 18 whereby a coarse and fine response is obtained as in the Fig. 3 form.

The operation of the Fig. 4 form of the invention is as follows: Assume that the current is off between transmitters 10, 10′ and receivers 11, 11′, that disks 15 and 15′ are set in any position, and that nozzles 17, 18 and 17′, 18′ are in any position relative to the disks. As soon as the current is established between the transmitters and the receivers, disks 15 and 15′ will assume the transmitted positions, but in this position it may be that, for example, nozzle 17 is uncovered while nozzle 18 is covered, and nozzle 17′ is covered while nozzle 18′ is uncovered. In this situation, the nozzles 17, 18 control, because the drop in pressure in chamber 24 is the large drop caused by large uncovered nozzle 17, while the drop in pressure in chamber 23 is the small drop caused by the small uncovered nozzle 18′. Therefore, the movement of the diaphragm 25 in Fig. 4 will be controlled by the large nozzle 17, in the case described, until the sets of nozzles 17, 18 and 17′, 18′ approach the transmitted position, that is, in alignment with the edges of disks 15, 15′, when it will be seen that nozzles 17 and 17′ will both be uncovered to give the maximum drop in chamber 24 while nozzles 18, 18′ will both be covered to give the minimum drop in chamber 23. Similarly, if nozzle 18 were the uncovered one, it would control, even though nozzle 18′ happened to be covered, because at this time only nozzle 17′ connecting with the other chamber would be uncovered. It will thus be seen that until the transmitted position is approached, the nozzles 17 and 18 are controlling.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a self-synchronous transmission system comprising a transmitter and a receiver, a servo-motor mechanism comprising a plurality of nozzles constituting a valve mechanism, a fluid pressure system for supplying fluid under pressure to said nozzles, said receiver having a member cooperating with said nozzles to cover and uncover the same, supports for said member and said nozzles, respectively, whereby said member and said nozzles may rotate continuously in either direction, a motor, and means actuated by the unequal reaction pressures in said fluid pressure system when said receiver means covers said nozzles unequally for actuating said motor.

2. In combination with a self-synchronous transmission system comprising a transmitter and a receiver, a servo-motor mechanism comprising a plurality of nozzles constituting a valve mechanism, a fluid pressure system for supplying fluid under pressure to said nozzles, said receiver having a member cooperating with said nozzles to cover and uncover the same, supports for said member and said nozzles, respectively, whereby said member and said nozzles may rotate continuously in either direction, a motor, means actuated by the unequal reaction pressures in said fluid pressure system when said receiver means covers said nozzles unequally for actuating said motor, and a follow-up from said motor to said nozzle.

3. In combination with a self-synchronous transmission system comprising fine and coarse transmitters and fine and coarse receivers, a servo-motor mechanism comprising a plurality of sets of nozzles constituting valve mechanisms, a fluid-pressure system for supplying fluid under pressure to said nozzles, said receivers each having a member cooperating with the respective set of nozzles to cover and uncover the same, supports for said members and said nozzles, respectively, whereby said members and said nozzles may rotate continuously in either direction, a motor, and means actuated by the unequal reaction pressures in said fluid pressure system when said receiver means cover said nozzles in each set unequally for actuating said motor.

4. In combination with a self-synchronous transmission system comprising fine and coarse transmitters and fine and coarse receivers, a servo-motor mechanism comprising a plurality of sets of nozzles constituting valve mechanisms, a fluid-pressure system for supplying fluid under pressure to said nozzles, said receivers each having a member cooperating with the respective set of nozzles to cover and uncover the same, supports for said members and said nozzles, respectively, whereby said members and said nozzles may rotate continuously in either direction, a motor, means actuated by the unequal reaction pressures in said fluid pressure system when said receiver means cover said nozzles in each set unequally for actuating said motor, and a follow-up from said motor to said sets of nozzles.

ELMER A. SPERRY, Jr.